United States Patent
De Hollander et al.

[11] 3,872,022
[45] Mar. 18, 1975

[54] SINTERING URANIUM OXIDE IN THE REACTION PRODUCTS OF HYDROGEN-CARBON DIOXIDE MIXTURES

[75] Inventors: William R. De Hollander; Yogesh Nivas, both of San Jose, Calif.

[73] Assignee: General Electric Company, San Jose, Calif.

[22] Filed: May 9, 1973

[21] Appl. No.: 358,737

Related U.S. Application Data
[63] Continuation-in-part of Ser. No. 62,353, Aug. 10, 1970, abandoned.

[52] U.S. Cl. ............ 252/301.1 R, 264/.5, 264/651, 423/261
[51] Int. Cl. ......................... G04b 35/64, G21c 3/62
[58] Field of Search ........... 264/.5, 65; 252/301.1 R; 423/261

[56] References Cited
UNITED STATES PATENTS
| | | | |
|---|---|---|---|
| 3,258,317 | 6/1966 | Brearton | 264/65 |
| 3,422,167 | 1/1969 | Bowman et al. | 264/.5 |
| 3,501,411 | 3/1970 | Triggiani et al. | 264/.5 |
| 3,504,058 | 3/1970 | Masselot | 264/.5 |

FOREIGN PATENTS OR APPLICATIONS
| | | | |
|---|---|---|---|
| 649,349 | 10/1964 | Belgium | 264/0.5 |
| 712,078 | 6/1965 | Canada | 264/0.5 |
| 717,459 | 9/1965 | Canada | 264/0.5 |

OTHER PUBLICATIONS
W. Trinks, et al., Industrial Furnaces, 5th Ed. 1961, John Wiley and Sons, Inc., New York, pages 156–160.

P. Benedek, et al., Chem. Abstracts, 1962, 8822(e).
E. Otsuka, et al. Chem. Abstracts, Vol. 61, 13159(h), "Kinetics and Thermodynamics in High-Temperature Gases," Mar. 19, 1970, NASA, SP–239, A & 93.

*Primary Examiner*—Donald J. Arnold
*Attorney, Agent, or Firm*—Ivor J. James, Jr.; Sam E. Laub; Samuel E. Turner

[57] ABSTRACT

Compacted pellets of uranium oxide alone or containing one or more additives such as plutonium dioxide, gadolinium oxide, titanium dioxide, silica and alumina are heated to a temperature in the range of 900°–1500°C in the presence of a gas which initially consists essentially of a mixture of hydrogen and carbon dioxide, either alone or with an inert carrier gas such as nitrogen and argon, and held at the desired temperature in this resultant atmosphere to sinter the pellets. The sintered pellets are then cooled in an atmosphere having an oxygen partial pressure in the range of $10^{-4}$ to $10^{-18}$ atmospheres of oxygen such as an atmosphere of dry hydrogen, wet hydrogen, dry carbon monoxide, wet carbon monoxide, inert gases such as nitrogen, argon, helium, and neon and mixtures of any of the foregoing including a mixture of hydrogen and carbon dioxide. The ratio of hydrogen to carbon dioxide in the gas mixture fed to the furnace is controlled to give a ratio of oxygen to uranium atoms in the sintered particles within the range of 1.98:1 to about 2.10:1. The water vapor present in the reaction products in the furnace atmosphere acts as a hydrolysis agent to aid removal of fluoride should such impurity be present in the uranium oxide.

19 Claims, 2 Drawing Figures

SINTERING URANIUM OXIDE IN THE REACTION PRODUCTS OF HYDROGEN-CARBON DIOXIDE MIXTURES

This application is a continuation-in-part of Ser. No. 62,353 filed Aug. 10, 1970 and now abandoned.

BACKGROUND OF THE INVENTION

This invention relates to the production of sintered uranium oxide containing compositions. One of the very important utilities of uranium oxide, especially uranium dioxide, is in nuclear power plants as a fuel in the generation of electric power. The uranium dioxide, either alone or in a mixture with other ceramics such as gadolinium oxide or plutonium oxide, is compacted to a given size and shape and sintered to achieve dense bodies for use in a nuclear fuel rod. The uranium present in uranium dioxide must be enriched with the U-235 isotope which is done in a gaseous state, the preferred practice being to use uranium hexafluoride. After enrichment it is necessary to convert the uranium hexafluoride to uranium dioxide. The resulting uranium dioxide can contain undesired fluoride ion concentrations and an oxygen to metal ratio above the desired ratio of about 1.98:1 to about 2.10:1.

The sintering of uranium dioxide structures has been used as the step in the process to attempt to reduce the oxygen and the fluoride content of the uranium dioxide. The current practice has been the use of wet hydrogen atmospheres at temperatures preferably greater than 1,600°C to achieve dense bodies of uranium dioxide. Past experience indicates a certain amount of water vapor with the hydrogen is required to remove the fluoride content from compacted ceramic structures during sintering, but the wet hydrogen process has not been satisfactory when the ceramic has high fluoride concentrations.

Another method presented in U.S. Pat. No. 3,375,306 for sintering dense uranium dioxide structures with or without ceramic additives is to heat the compressed powder at a temperature of 1,300° to 1,600°C in a sintering atmosphere of carbon dioxide or a mixture of carbon dioxide and carbon monoxide and cooling the sintered structure in a reducing atmosphere which varies as the composition of the structure varies. Where the structure being sintered is uranium dioxide the cooling gas is dry hydrogen, wet hydrogen or a mixture of carbon dioxide and carbon monoxide. Where the structure is uranium dioxide with an additive of plutonium dioxide, the cooling gas is steam or carbon dioxide mixed with carbon monoxide. The use of a mixture of carbon dioxide and carbon monoxide is more costly than use of wet hydrogen but enables the use of lower temperatures to achieve sintered structures of high density. However this carbon monoxide-carbon dioxide sintering atmosphere does not appreciably decrease the fluoride content of the uranium dioxide structures.

Sintering temperatures of about 1,600°C or higher produce uranium dioxide structures having large grain sizes with undesirable properties for some fuel applications. Uranium dioxide structures of smaller grain size have higher creep rates when compared to the creep rates of uranium dioxide structures of larger grain size. A higher creep rate for a uranium dioxide structure is desirable for better fuel performance. It has also been determined that other mechanical properties of smaller grain uranium dioxide are superior to the properties of coarser grain uranium dioxide. The foregoing has made it desirable to lower the sintering temperature of uranium dioxides, and more generally of structures rich in uranium oxide, in addition to controlling the oxygen to metal ratio of the sintered structure and removing undesirable impurities from the sintered structure such as fluoride ions.

Lower sintering temperatures have other desirable features including cost savings as less power is expended in heating the sintering furnace, a longer functional life for the sintering furnace and its associated fixtures, less corrosion of the furnace components and the possibility of adapting a continuous conveyor belt or other means of transporting the structures rich in uranium oxide through the furnace.

OBJECTS OF THE INVENTION

Accordingly it is an object of this invention to lower the temperature at which the sintering of structures of compacted powders rich in uranium oxide is accomplished and still obtain dense structures of the sintered ceramic.

A further object of this invention is the use of an atmosphere of a mixture of hydrogen and carbon dioxide to remove impurities such as fluoride ions from compacted structures of uranium oxide containing compositions during sintering.

A still further object of this invention is the use of an atmosphere of a mixture of hydrogen and carbon dioxide to control the ratio of oxygen to metal atoms during sintering compacted structures of uranium oxide containing compositions.

Still another object of this invention is the sintering of uranium oxide under an atmosphere of a mixture of hydrogen and carbon dioxide which reacts to give carbon monoxide and water vapor and removes fluoride ions and other undesirable constituents from the uranium oxide during sintering.

A still further object of this invention is the use of an atmosphere of a mixture of hydrogen and carbon dioxide for sintering structures of compacted uranium dioxide powders.

Other objects and advantages of this invention will become apparent from the following specification and the appended claims.

SUMMARY OF THE INVENTION

The above objects, and others, are accomplished according to this invention by providing a striking improvement in the sintering of ceramic structures of compacted powder rich in uranium oxide involving heating the structures at a temperature in the range of about 900° to about 1,500°C in a sintering atmosphere of a mixture of hydrogen and carbon dioxide. The carbon dioxide and hydrogen react to give carbon monoxide and water vapor which enables the removal of undesirable impurities from the ceramic structures such as fluoride ions and the control of the oxygen content of the ceramic. After undergoing the above reaction, the carbon dioxide-hydrogen atmosphere maintained over the ceramic controls the partial pressure of oxygen during sintering and provides water vapor promoting the removal of fluoride ions from the ceramic being sintered.

While this process is especially useful with ceramic compositions of uranium dioxide and mixtures of uranium oxides having an oxygen to uranium ratio of up to 2.25, it is particularly useful with uranium dioxide containing ceramic compositions with one or more ceramic additives such as gadolinium oxide and plutonium oxide.

BRIEF DESCRIPTION OF THE DRAWING

The practice of the disclosed process will be further understood by reference to the accompanying drawings in which.

DETAILED DESCRIPTION OF THE INVENTION

Figure 1:
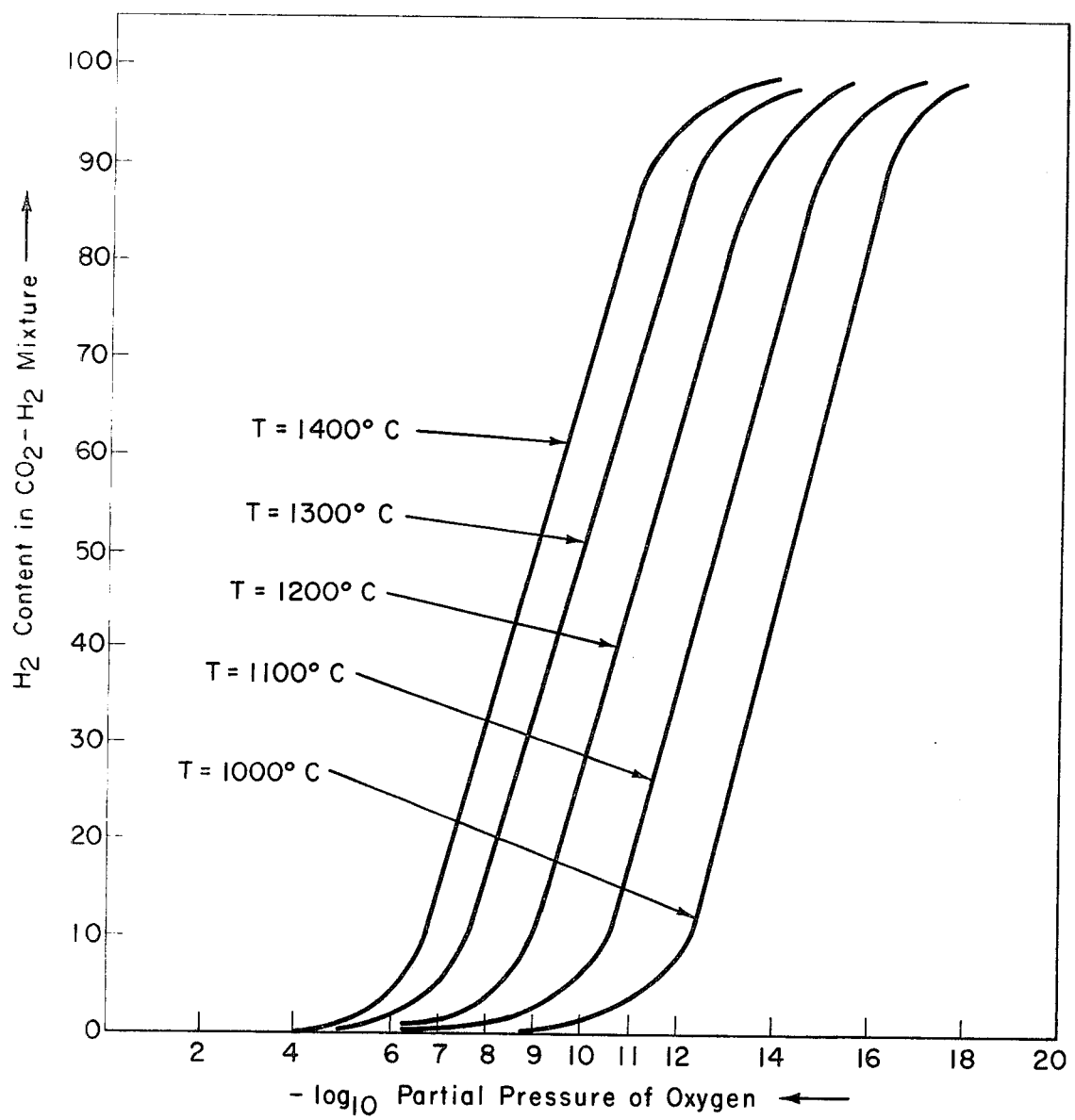
FIG. 1 presents a graph of the partial pressure of oxygen versus the hydrogen content of the carbon dioxide-hydrogen atmosphere at various temperatures and FIG. 2 presents a furnace adapted to receive a sintering atmosphere as disclosed in this invention for ceramic shapes being sintered in the furnace.

It has been surprisingly discovered that compacted powders of a ceramic comprising uranium oxide containing compositions, with or without ceramic additives, may be sintered to very high density by heating to a temperature in the range of about 900° to about 1,500°C in an atmosphere consisting of a mixture of hydrogen and carbon dioxide. The sintering process of this invention produces a ceramic composition having a controlled ratio of oxygen to metal atoms, a fluoride ion content of about 25 parts per million or less and a density up to about 98 percent of theoretical density and preferably a density in the range of 92 to 96 percent of theoretical density. The sintering process of this invention, in addition to controlling the fluoride content, density and oxygen to metal ratio of the resulting sintered ceramic, removes other undesired impurities and contamination from the uranium oxide containing compositions such as entrapped hydrocarbons, entrapped gases, greases, oils, voids, etc. After completion of the sintering, the sintered ceramic is cooled in an atmosphere having an oxygen partial pressure in the range of $10^{-4}$ to $10^{-18}$ atmospheres of oxygen such as an atmosphere of dry hydrogen, wet hydrogen, dry carbon monoxide, wet carbon monoxide, inert gases such as nitrogen, argon, helium, and neon and mixtures of the foregoing including a mixture of hydrogen and carbon dioxide preferably within the ranges disclosed in this invention for the sintering step.

The phase "uranium oxide containing compositions" is used herein to cover compositions capable of being sintered in the practice of this invention which include uranium dioxide ($UO_2$) and mixtures of uranium oxide having an oxygen to metal ratio of up to 2.25 which could include mixtures of uranium dioxide with one or more of the following: uranium trioxide ($UO_3$), uranium tritaoctoxide ($U_3O_8$), uranium sesquioxide ($U_2O_3$), uranium pentoxide ($U_2O_5$), or uranium tetroxide ($UO_4$). The invention is also applicable for the foregoing uranium oxide containing compositions with one or more ceramic additives including the plutonium oxides such as plutonium dioxide ($PuO_2$), gadolinium oxide ($Gd_2O_3$), titanium dioxide ($TiO_2$), silicon dioxide ($SiO_2$), aluminum oxide ($Al_2O_3$) and combinations thereof. The plutonium dioxide can be present in amounts up to about 30 percent by weight of the composition; the gadolinium oxide can be present in amounts up to about 15 percent by weight of the composition; the titanium dioxide can be present in amounts up to about 5 percent by weight of the composition; the silicon dioxide can be present in amounts up to about 5 percent by weight of the composition; and the aluminum dioxide can be present in amounts up to about 5 percent by weight of the composition.

The composition of the sintering atmosphere can vary greatly depending on the fluoride ion content of the ceramic and the oxygen to metal ratio of the ceramic before sintering and the ratio desired after sintering as well as the density to be achieved for the sintered ceramic. A sintering atmosphere in the range of about 0.5 to about 90 percent hydrogen by volume with the balance carbon dioxide can be employed, and a preferred range is about 2 to about 20 percent hydrogen by volume with the balance carbon dioxide. Any source of hydrogen can be employed such as cylinders and tanks of hydrogen or a gas such as ammonia which dissociates to provide a source of hydrogen. The sintering atmosphere can contain carrier gases such as nitrogen and argon in addition to the essential constituents of hydrogen and carbon dioxide.

The mixture of carbon dioxide and hydrogen constituting the sintering atmosphere undergoes a thermodynamic equilibrium of the following reaction: $CO_2 + H_2 \rightarrow CO + H_2O$. The degree of reaction between these two gases is determined by the equilibrium constant of the above reaction which is a function of the temperature of the atmosphere. The atomic ratio of oxygen to metal of the ceramic being sintered equilibrates with the partial pressure of oxygen in the system with a fixed value at a given temperature. The desired oxygen to metal ratio of the uranium oxide compositions are obtained by adjusting the partial pressure of oxygen in the sintering atmosphere. The partial pressure of oxygen in the sintering atmosphere can be reduced by an increase in the hydrogen constituent of the sintering atmosphere and an increase in the partial pressure of oxygen in the sintering atmosphere is achieved by an increase in the carbon dioxide constituent of the sintering atmosphere.

In the practice of this invention, an enhanced sintering rate results during the sintering of the uranium oxide containing compositions due to the higher diffusion rate of the slower moving species of metallic ions in the sintered composition. By choosing a gas composition having a mixture of carbon dioxide and hydrogen determined by the partial pressure of oxygen desired for the sintering atmosphere at a given sintering temperature, the uranium oxide containing composition can be sintered at the desired oxygen to metal ratio giving enhanced sintering at lower temperatures than practiced in the prior art. FIG. 1 presents a graph of the relationship between the partial pressure of oxygen and the hydrogen content in the carbon dioxide-hydrogen atmosphere for given temperatures. The water vapor so produced from the reaction given above acts as a hydrolysis agent for removing fluoride ions and when the hydrogen component is within the range set forth above the final fluoride content of the uranium oxide composition will be reduced to less than 25 parts per million. This represents a significant reduction in the fluoride content of the uranium oxide as commercially available uranium oxide powders suitable for sintering can contain up to 0.5% by weight or more of fluoride ions. As stated previously, a certain amount of water vapor is needed to promote the removal of fluoride from compacted uranium oxide structures during sintering. The amount of water vapor in the carbon dioxide-hydrogen atmosphere decreases as the gas composition is selected from an increasingly carbon dioxide rich or an increasingly hydrogen rich mixture. But relatively small amounts of water vapor in the sintering atmosphere disclosed in this invention achieves a much greater reduction in the fluoride content at the same sintering temperature than can be achieved using a sintering atmosphere without the presence of water vapor (e.g., dry carbon dioxide or dry hydrogen).

The following is representative of the preliminary processing of the uranium oxide powder into pellet form before it is introduced to the furnace, but this is in no way meant to be a limitation on the teaching of this invention. The uranium oxide employed in the process of this invention can be commercial grades of the ceramic having up to 0.5% by weight fluoride ions or greater and varying oxygen to metal ratios. The uranium oxide in powder form is pressed in a press at pressures up to about 10,000 pounds per square inch into desired shapes, such as small cylinders, cubes, parallelepipeds, etc. These desired shapes are then granulated in a granulator and screened through a screen having openings in the range of about 5 to about 20 mesh. This processing sequence increases the flow properties and bulk density of the uranium oxide powder. The granulated powder is then pressed into desired shapes such as small cylinders, cubes, parallelepipeds, etc., in a press with applied pressure up to 40,000 pounds per square inch. Representative dimensions of cylindrical shapes of pellets made by this invention are pellets having a diameter of about one-half inch and a height of about one-half inch.

The invention can be applied in a batch process where the pellets of uranium oxide are placed in a suitable container in a cold furnace, heated to temperature under the hydrogen-carbon dioxide atmosphere as described in this invention and maintained at this temperature for a period of from about 1 to about 5 hours followed by cooling the pellets in an atmosphere having an oxygen partial pressure in the range of $10^{-4}$ to $10^{-18}$ atomospheres of oxygen with a preferred value being in the range of $10^{-12}$ to $10^{-18}$ atmospheres of oxygen.

Figure 2:
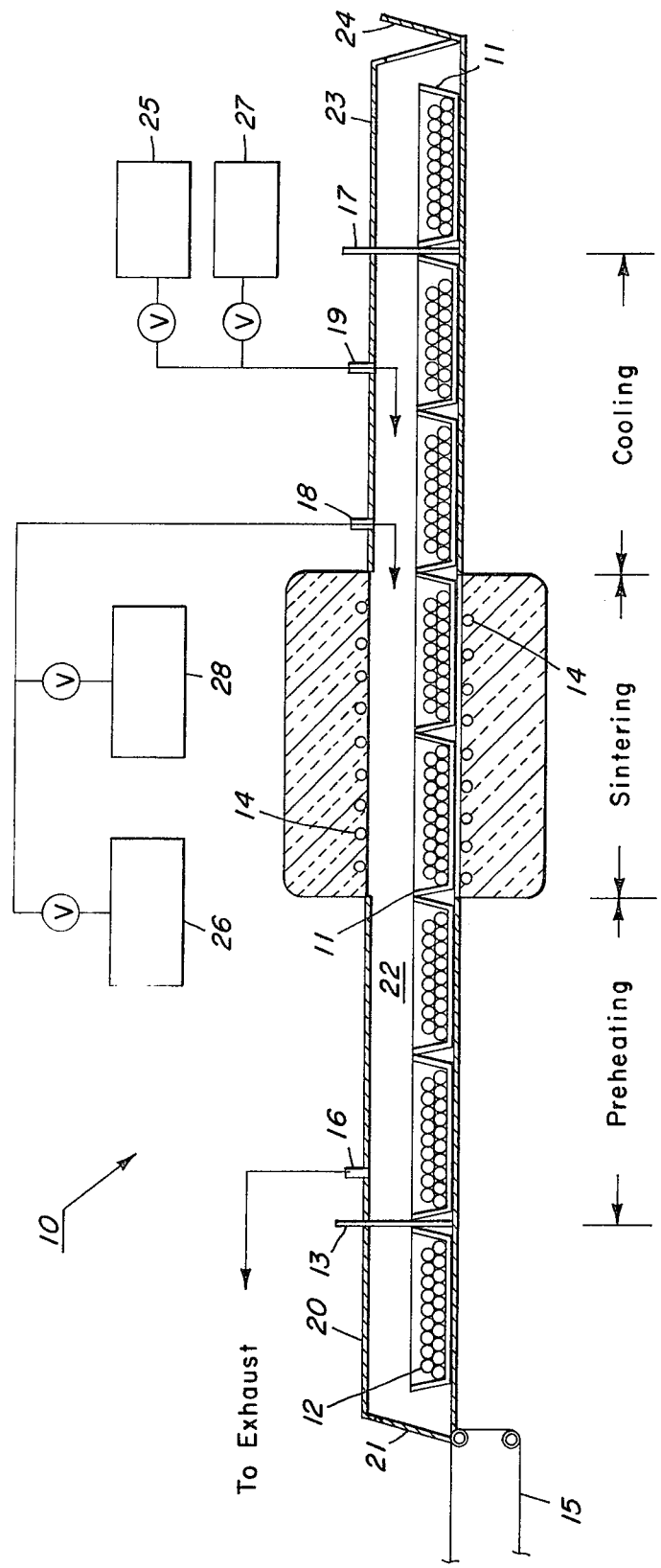

Another embodiment of the process of this invention as shown in FIG. 2 has placing of the uranium oxide pellets 12 in a series of ceramic boats 11 placed in a furnace generally represented by number 10 having a gas outlet 16 going to an exhaust. The furnace has three zones of temperature as generally indicated in the drawing and designated a preheating zone, a sintering zone and a cooling zone. The boats 11 are pushed through the furnace 10 by introduction of additional boats 11. Each boat 11 passes through door 21 to the purge chamber 20 with door 21 then being closed followed by lifting of door 13 so the boat can be pushed into furnace cavity 22 by a device such as a pushing rod (not shown). The first region through which the boat passes is a preheating zone which has an increasing temperature as the boat moves closer to heating elements 14. In the preheating zone the atmosphere of the furnace 10 is a mixture of hydrogen and carbon dioxide as taught in the practice of this invention. It is thought that an appreciable amount of the fluoride and oxygen to be removed from the pellets 12 is accomplished before the ceramic boat reaches the sintering zone. When the boat 11 reaches the sintering zone, the temperature is maintained in the range of 900° to 1,500°C during which a substantial proportion of the sintering practiced in this invention occurs. The atmosphere in the sintering zone is the same as maintained in the preheat zone with the atmosphere varying between about 0.5 to about 90 percent by volume hydrogen with the balance being carbon dioxide. When a boat reaches the cooling zone the temperature falls as the distance from heating elements 14 is increased. In FIG. 2 there are shown two gas inlets 18 and 19, with gas inlet 18 being located toward the heating element 14 while gas inlet 19 is located toward the door 17 which could be a lift door opening into purge chamber 23. Door 24 is opened to enable removal of boats 11 from purge chamber 23. As previously stated the atmosphere in the cooling zone can be an atmosphere in the range of $10^{-4}$ to $10^{-18}$ atmospheres of oxygen, with preferred gases being dry hydrogen, wet hydrogen or a mixture of hydrogen and carbon dioxide within the range disclosed in this invention. Where dry hydrogen or wet hydrogen is maintained in the cooling zone, the hydrogen gas is fed into inlet 19 from a tank 25 with carbon dioxide being fed into the furnace in gas inlet 18 from tank 26, both gases being fed into the furnace in amounts sufficient to ultimately form a mixture as disclosed in this invention. Where a mixture of hydrogen and carbon dioxide is maintained in the cooling zone, both hydrogen and carbon dioxide are fed into inlet 19 from tanks 25 (hydrogen) and 27 (carbon dioxide) with inlet 18 being closed. If a different mixture of carbon dioxide and hydrogen is desired in the cooling zone than in the sintering zone, the cooling zone mixture is fed into inlet 19 from tank 25 (hydrogen) and tank 27 (carbon dioxide) and the sintering zone mixture is fed into inlet 18 from tank 26 (carbon dioxide) and tank 28 (hydrogen). From the figure it can be seen that the sintering atmosphere flows in the direction opposite the direction the ceramic boats are being moved through the furnace. This insures maintaining the desired oxygen to metal ratio and the removal of fluoride content from the sintered uranium oxide structure. The sintering atmosphere can flow in the same direction in which the ceramic boat is being moved if desired but a higher flow rate of gas is preferred for this arrangement. The flow rate of gas through an experimental tube furnace would be in the range of about 1 to about 10 cubic feet per hour in a furnace having a heating chamber 22 of 1½ inches in diameter and 3 feet in length.

The heating means of the furnace can be commercially available heating elements such as resistance heating elements and induction coils. The furnace walls can be made of ceramic such as alumina or high temperature metals such as high temperature stainless steels.

A stoichiometric uranium oxide product, for example, a uranium dioxide product in which the ratio of oxygen atoms to metal atoms is substantially within the range of about 1.98:1 to about 2.10:1 and preferably about 2.00:1, may be produced by cooling the sintered material in an atmosphere such as dry hydrogen, wet hydrogen or a mixture of carbon dioxide and hydrogen. It is possible to select a mixture of hydrogen and carbon dioxide such that preheating, sintering and cooling can be carried out in the same atmosphere to achieve high density and an oxygen to metal ratio of substantially about 1.98:1 to about 2.04:1.

The discovery of this invention has the advantage of sintering uranium oxide structures at lower temperatures of about 900° to about 1,500°C, thus avoiding the necessity for heating at temperatures in excess of 1,600°C when utilizing a wet hydrogen atmosphere for sintering uranium oxides. The present invention also has the advantage of controlling the partial pressure of oxygen in the furnace by controlling the relative proportions of carbon dioxide and hydrogen maintained in the furnace.

Another feature of this invention is the range of processing parameters enabling a person skilled in the art great flexibility in selecting the precise operating parameters depending on the properties desired for the sintered uranium oxide containing composition.

The sintering atmosphere disclosed in this invention is either comparable or cheaper in cost than gas atmospheres currently being utilized in commercial sintering of uranium oxide structures. The sintering atmosphere of this invention enables the use of lower furnace temperatures with lower operating costs for heating the furnace and gives a longer furnace life due to less corrosive conditions associated with fluoride containing atmospheres at lower furnace temperatures.

The teaching of this invention and the methods by which it is to be performed will become apparent from the following examples which are offered to be illustrative of the invention but are not to serve as a limitation of the teaching of this invention.

EXAMPLE 1

A batch of cylindrical structures of compacted uranium dioxide powder of about 0.5 inches in diameter and 0.6 inches in height is placed in an alumina boat and charged to a cold furnace. The furnace is heated to 1,100°C in 2 hours and maintained at that temperature for 4 hours in an atmosphere of 10% by volume hydrogen with the balance being carbon dioxide. The same atmosphere is maintained throughout this heating cycle. The structures are then cooled in dry hydrogen to room temperature giving a structure having an average density of 95.0 percent of theoretical density and an oxygen to uranium ratio of 2.006. The initial fluoride ion content of the structures before sintering is 570 parts per million and the fluoride ion content of the sintered structures is 5 parts per million.

EXAMPLE 2

Another batch of cylindrical structures of compacted uranium dioxide powder (about 0.5 inches in diameter and 0.6 inches in height) is placed in an alumina boat and charged to a cold furnace. The furnace is heated to 1,100°C in 2 hours and maintained at that temperature for 4 hours in an atmosphere of 5% by volume hydrogen and 95% by volume carbon dioxide. The sintered pellets are then cooled to room temperature in the same atmosphere giving a structure having an average density of 97.2 percent of theoretical density, a final oxygen to uranium ratio of 2.007, fluoride ion content of six parts per million, entrapped gas in the ceramic of 3.7 microliters per gram and a grain size of about 1 micron. Before sintering, the fluoride ion content of the cylindrical structures was 134 parts per million and the oxygen to metal ratio was 2.085.

EXAMPLE 3

Another batch of cylindrical structures of compacted uranium dioxide powder (about 0.5 inches in diameter and 0.6 inches in height) having a fluoride ion content of 151 parts per million are placed in an alumina boat in a cold furnace. The furnace is heated to 1,300°C in 2½ hours and maintained at that temperature for 4 hours in an atmosphere of 10% hydrogen by volume with the balance being carbon dioxide, this atmosphere being maintained throughout the heating cycle. The structures are then cooled in the same atmosphere to room temperature giving a structure having an average density of 95.7 percent of theoretical density, an oxygen to uranium ratio of 2.012 and a fluoride ion content of 2 parts per million.

EXAMPLE 4

A batch of uranium dioxide powder (fluoride ion content of about 80 parts per million) was mixed with an additive of 3 percent by weight gadolinium oxide and the powder are pressed into cylindrical pellets of about 0.5 inches in diameter and 0.6 inches in height. These pellets were sintered at 1,425°C for 4 hours at this temperature in an atmosphere of 20% hydrogen by volume with the balance of the atmosphere being carbon dioxide. This atmosphere was maintained throughout the heating cycle and during cooling to room temperature. The sintered structure has an average density of 95% of theoretical density and a fluoride content of 5 parts per million.

It is to be understood that, although the invention has been described with specific reference to particular embodiments thereof, it is not to be so limited, since changes and alterations therein may be made which are within the full intended scope of this invention as defined by the appended claims.

What is claimed is:

1. A method of producing dense, sintered bodies of a particulate composition comprising uranium oxide, comprising the steps of heating compacted bodies of the composition comprising uranium oxide, which composition can contain fluoride impurities, to a temperature in the range of about 900° to about 1,500°C in a sintering atmosphere consisting essentially of an initial mixture of carbon dioxide and hydrogen, either alone or with an inert gas, which mixture reacts to give the presence of water vapor and carbon monoxide, sintering the bodies in said atmosphere at a temperature in the range of 900° to 1,500°C, wherein said initial mixture of carbon dioxide and hydrogen is selected to give a ratio of oxygen to uranium atoms in the sintered uranium oxide within the range of about 1.98:1 to about 2.10:1, and thereafter cooling the sintered body in a cooling atmosphere having an oxygen partial pressure in the range of $10^{-4}$ to $10^{-18}$ atmospheres of oxygen.

2. A method according to claim 1 in which the sintering atmosphere has from about 0.5 to about 90 percent hydrogen by volume and the balance is carbon dioxide.

3. A method according to claim 1 in which the sintering atmosphere has from about 2 to about 20 percent hydrogen by volume and the balance is carbon dioxide.

4. A method according to claim 1 in which the uranium oxide is uranium dioxide.

5. A method according to claim 1 in which the cooling atmosphere is a mixture of hydrogen and carbon dioxide having about 0.5 to about 90 percent hydrogen by volume and the balance is carbon dioxide.

6. A method according to claim 1 in which the cooling atmosphere is dry hydrogen.

7. A method according to claim 1 in which the cooling atmosphere is wet hydrogen.

8. A method according to claim 1 in which the cooling atmosphere is dry carbon monoxide.

9. A method according to claim 1 in which the cooling atmosphere is wet carbon monoxide.

10. A method according to claim 1 in which the cooling atmosphere is an inert gas.

11. The method according to claim 1 in which the compacted bodies contain a mixture of uranium dioxide and plutonium dioxide, the plutonium dioxide being present in an amount up to about 30 percent by weight.

12. The method according to claim 1 in which the compacted bodies contain a mixture of uranium dioxide and gadolinium oxide, the gadolinium oxide being present in an amount up to about 15 percent by weight.

13. The method according to claim 1 in which the compacted bodies contain a mixture of uranium dioxide and titanium dioxide, the titanium dioxide being present in an amount up to about 5 percent by weight.

14. The method according to claim 1 in which the compacted bodies contain a mixture of uranium dioxide and silicon dioxide, the silicon dioxide being present in an amount up to about 5 percent by weight.

15. The method according to claim 1 in which the compacted bodies contain a mixture of uranium dioxide and aluminum oxide, the aluminum oxide being present in an amount up to about 5 percent by weight.

16. The method according to claim 1 in which the hydrogen in the sintering atmosphere is from dissociated ammonia and the sintering atmosphere has a carrier gas of nitrogen.

17. A method according to claim 1 in which the sintering atmosphere includes an inert gas.

18. A method according to claim 17 in which the inert gas is argon.

19. A method according to claim 17 in which the inert gas is nitrogen.

* * * * *